Jan. 8, 1963 G. P. BENISH 3,072,827
CIRCUIT PROTECTING DEVICE
Filed April 1, 1957 2 Sheets-Sheet 1

INVENTOR:
GEORGE P. BENISH
BY
ATTORNEY

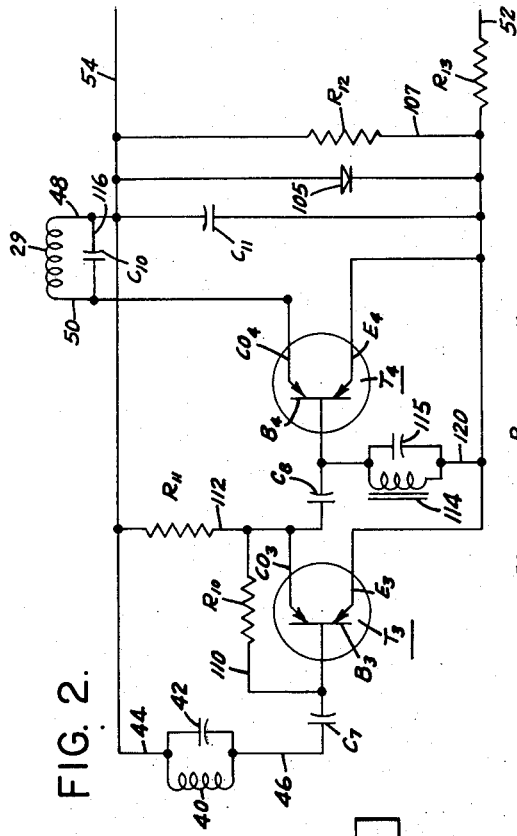
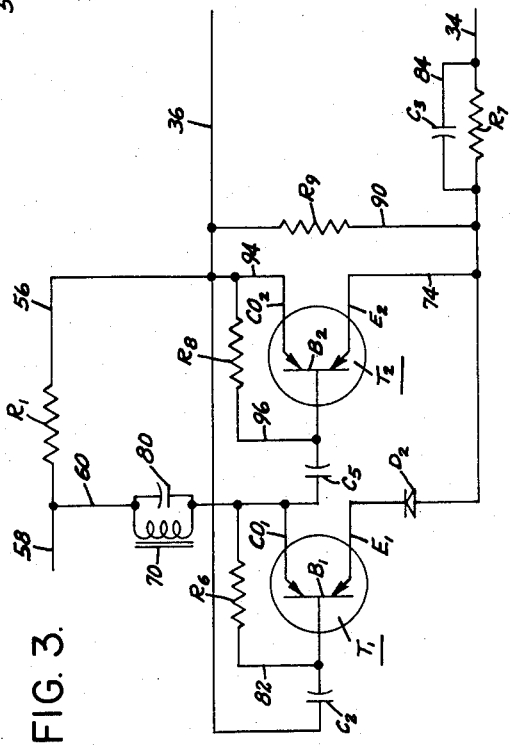

United States Patent Office 3,072,827
Patented Jan. 8, 1963

3,072,827
CIRCUIT PROTECTING DEVICE
George P. Benish, Kirkwood, Mo., assignor to Joy Manufacturing Company, Pittsburgh, Pa., a corporation of Pennsylvania
Filed Apr. 1, 1957, Ser. No. 649,842
18 Claims. (Cl. 317—18)

My invention relates in general to a circuit protecting device and in particular to an improved circuit protecting device for electrical apparatus which is electrically energized by means of a portable power supply cable without requiring a separate grounding conductor in or in addition to the supply cable.

At the present time the mining industry, such as the underground coal mining industry, is subject to regulations which require that electrical apparatus, such as a mining machine or shuttle car, which is energized by means of a portable electrical power supply cable either be connected to a separate ground conductor or that some equivalent electrical protection be provided. Heretofore some prior attempts to provide equivalent electrical protection have employed electrical energizable relays for opening the electrical supply lines to the electrical apparatus which relays are energized by fault conditions occurring at the machine. Such prior relay systems have not been entirely satisfactory as many fault conditions occur which create an electrical hazard which does not cause operation of the relay system.

Accordingly one object of my invention is to provide a new and improved circuit protecting device which does not require a ground conductor.

Another object of my invention is to provide a new and improved circuit protecting device having circuit interrupting means controlled by means responsive to various electrical fault conditions occurring in an electrical circuit connected to the deenergizable side of the circuit interrupting means.

Still another object of my invention is to provide a new and improved circuit protecting device having a remotely located signal generating means for controlling circuit interrupting means which signal generating means is responsive to various electrical fault conditions occurring in an electrical circuit connected to the deenergizable side of the circuit interrupting means.

A more specific object of my invention is to provide a new and improved circuit protecting device for electrical apparatus comprising a signal generating means supported by the electrical apparatus and electrically connected to supply conductors therefor and a stationary control having switch means for controlling the energization of the supply conductors and means responsive to the output of the signal generating means for controlling the operation of the switch means.

These and other objects of my invention will become more apparent when taken in consideration with the following detailed description of a preferred embodiment of my invention and the following drawings in which:

FIGURE 2 is a circuit diagram of amplifier means constructed in accordance with the principles of my invention for utilization in the circuit as shown in FIGURE 1.

FIGURE 3 is a circuit diagram of an oscillator means constructed in accordance with the principle of my invention for utilization in the circuit as shown in FIGURE 1.

FIGURE 4 is a circuit diagram of the fault responsive portion of the circuit shown in FIG. 1 in which a relay is employed.

Figure 1:
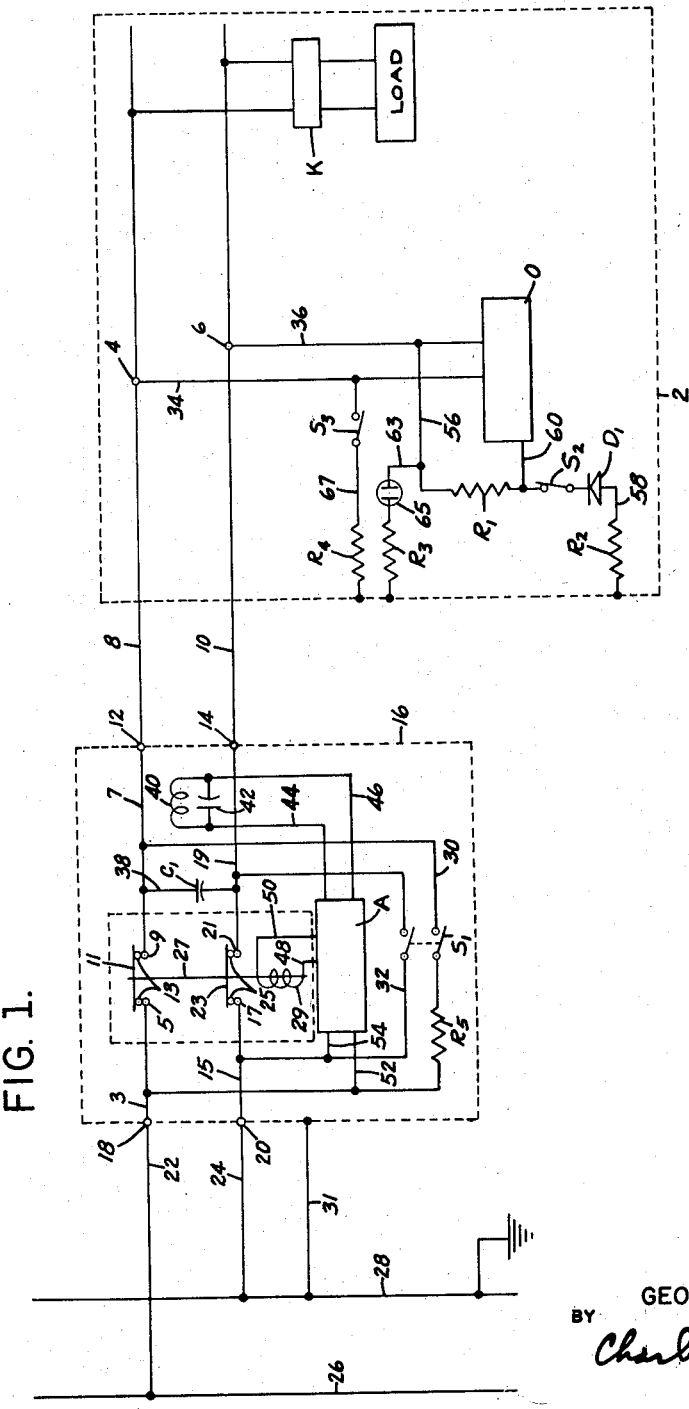
FIGURE 1 is a circuit diagram of an electrical distribution system having circuit protecting means constructed in accordance with the principle of my invention connected thereto.

As indicated, my invention is ideally suited for controlling the electrical energization of electrical apparatus such as a coal mining machine or shuttle car. Accordingly, referring to FIGURE 1, the frame 2 of such a machine has been shown in dotted outline in view of the fact that the frame 2 may be of any particular desired form depending on the particular type of machine or apparatus upon which my invention is used. As will become apparent the frame 2 is formed from a suitable electrical conducting material, such as a suitable ferrous alloy, having sufficient mechanical strength for the purposes for which the machine is designed. The frame 2 is provided with spaced electrical terminals 4 and 6 which are electrically insulated therefrom to permit connecting spaced electrical conductors 8 and 10 thereto, respectively. The opposite end of the conductors 8 and 10 are connected to spaced electrical terminals 12 and 14, respectively, which are supported by a suitable housing 16 and which are electrically insulated therefrom. The housing 16 is shown in dotted outline as it may be of any suitable size and shape to support the various components therein as hereinafter described and is formed from any suitable material such as steel.

A pair of spaced electrical terminals 18 and 20 are also supported by the housing 16 and electrically insulated therefrom which are electrically connected to spaced conductors 22 and 24 respectively, the other ends of which are electrically connected in any suitable manner to spaced electrical supply conductors 26 and 28, respectively. The supply conductors 26 and 28 are connected to any suitable source of electrical energy (not shown). In describing my invention with reference to mining equipment it is to be realized that the conductor 26 may comprise the bare overhead trolley wire and the conductor 28 may comprise a bare car rail on the mine floor. In order to insure positive grounding of the housing 16, the housing 16 is electrically connected by means of a suitable electrical conductor 31 to the conductor 28. For mining equipment the conductors 26 and 28 are frequently connected to either an alternating or direct current source at various voltages. For the purpose only of describing my invention the supply conductor 28 is shown as being grounded and will be considered as being negative with respect to a direct current source, and consequently the conductor 26 will be considered positive with respect to the direct current source.

As shown the terminal 18 is electrically connected by means of a suitable electrical conductor 3 to a suitable electrical contact 5 and the terminal 12 is electrically connected by means of a suitable electrical conductor 7 to a suitable electrical contact 9 which is spaced from the electrical contact 5. In a similar manner the terminal 20 is electrically connected by means of a suitable conductor 15 to a suitable electrical contact 17 and the terminal 14 is connected by a suitable conductor 19 to a suitable electrical contact 21 which is spaced from the contact 17. The contacts 5, 9 and 17, 21 are adapted to be simultaneously connected to each other, respectively, by any suitable circuit interrupting means which is movable into and out of a circuit making position and which is biased by suitable means, not shown, so as to normally keep the conductors 7 and 19 deenergized.

For the purpose of my invention a specific circuit interrupting means need not be employed as any suitable circuit interrupting means such as a circuit breaker, relay or contactor having an operating means for controlling the movement of the circuit interrupting means may be conveniently employed. Nor is it essential that both sides of the supply line to the conductors 8 and 10, be interrupted, however, such interruption is preferable. Further, it is to be realized that the various spaced conductors indicated herein, such as spaced conductors 8 and 10, may comprise a two-conductor cable having suitable electrical coupling means at each of its ends to engage other electrical coupling means on the other components with which they engage rather than the various electrical terminals as described.

The circuit interrupting means shown comprises a pair of spaced electrical conducting bridging bars 11 and 23 having spaced electrical contacts 13 and 25, respectively thereon, each of which is supported by means of an operating rod 27 to be movable into and out of engagement with the contacts 5, 9 and 17, 21, respectively. The movement of the rod 27 is controlled by means of a suitable electrical operating coil 29 as is well known in the art and, as will become more apparent hereinafter, the coil 29 is electrically energized to cause the rod 27 with the contacts 13 and 25 supported thereby to move from their normally open position into engagement with their respective engageable contacts.

As shown conductors 3 and 15 are selectively electrically connectable to conductors 7 and 19, respectively, by means of suitable spaced electrical conductors 30 and 32 which are electrically connected thereto. A suitable double pole electrical switch $S_1$, as is well known in the art, is electrically connected to the conductors 30 and 32 so that the conductors 8 and 10 may be energized independently of the circuit interrupting means. A signal generating means which, as shown, comprises a feedback oscillator O is electrically connected by spaced electrical conductors 34 and 36 to the terminals 4 and 6, respectively. The oscillator O is of any suitable construction, as is well known in the art, which generates an alternating current signal which is impressed across the conductors 34 and 36 and consequently the conductors 8—10 and 7—19. A condenser $C_1$ is electrically connected by means of a suitable electrical conductor 38 across the conductors 7 and 19 in any suitable manner and has a capacitance so as to provide a low impedance path for the output signal of the oscillator O as is well known in the art. With such a construction the output signal of the oscillator O will flow from the oscillator O through the conductors 34, 8 and 7, through the condenser $C_1$ through conductor 38, to the conductors 19, 10 and 36 back to the oscillator O. Further as capacitor $C_1$ is connected across the supply conductors to the oscillator O it will also function to prevent any undesirable line harmonics, of the same frequency as the oscillator O signal output, from causing a false signal to be detected by the detecting element described herein.

A detecting element, which as shown comprises a parallel connected coil 40 and a condenser 42 which are tuned to the output frequency of the oscillator O, is located between the conductors 7 and 19 so as to produce a voltage thereacross in response to the oscillator current through the conductors 7 and 19, as described. In practice greater sensitivity of the detector coil 40 and condenser 42 has been obtained when the coil 40 is located closely adjacent the conductors 7 and 19. If desired, other types of current responsive means may be employed for such detecting means. As shown, the opposite ends of the coil 40 and the condenser 42 are electrically connected by means of suitable electrical conductors 44 and 46, respectively, to suitable amplifying means A which has spaced electrical output conductors 48 and 50 connected to the opposite ends of the coil 29. In order to electrically energize the amplifier A it is electrically connected by means of spaced electrical conductors 52 and 54 to the electrical conductors 30 and 32, respectively, ahead of the switch $S_1$ so as to be energizable upon the energization of the conductors 3 and 15 regardless of the position of the switch $S_1$.

As will become more apparent hereinafter the amplifier A is of any suitable construction so as to amplify the signal detected by the coil 40 and a condenser 42 to a sufficient value to produce a current flow through the operating coil 29 which is sufficient to cause movement of the operating rod 27 of the circuit interrupting means to connect the conductors 3, 7 and 15, 19, to each other, respectively, as indicated. It is to be realized that the use of an amplifier A is required only with reference to the commercially available circuit interrupting means employed and that such an amplifier is not required if the current output of the detector element is sufficient to cause operation of the circuit interrupting means. In view of the fact that the detector element develops a small current flow therethrough in response to the signal output of the oscillator O, the operating coil 29 would have to be extremely sensitive in order to obtain closing of the circuit interrupting means by the detector element current alone. Accordingly the amplifier A is preferred in the embodiment shown of my invention in order to eliminate the necessity of providing a sensitive operating coil 29.

Thus in operation, with both the circuit interrupting means and the switch $S_1$ in their normal open position, the oscillator O is energizable by closing switch $S_1$ by means of a circuit comprising the conductors 22, 3, 30, 7, 8 and 34 and the conductors 24, 15, 32, 19, 10 and 36. Upon such energization the oscillator O output traverses the circuit as heretofore indicated. For purposes of my invention, the holding coil 29 must be continuously energized to hold the circuit interrupting means in the closed position, accordingly, it will be obvious that the position of the circuit interrupting means is dependent upon the energization of the oscillator O. Thus, any failure of the oscillator O to produce an output signal will cause the circuit interrupting means to move to its normally open position.

In order to provide electrical fault responsive means an electrical resistance element $R_1$ having a suitable ohmic value as hereinafter described, has its opposite ends electrically connected by means of suitable electrical conductors 56 and 58 to the electrical conductor 36 and the frame 2, respectively. The conductor 58 is also electrically connected by means of a suitable electrical conductor 60 to the oscillator O as more fully described hereinafter. Thus, any electrical fault current, which exists above ground potential, will flow through the frame 2, conductor 58, resistor $R_1$, and conductors 56 and 36 to the conductor 10 which is at ground potential when the circuit interrupter is closed. An important feature of my invention resides in the use of a resistance $R_1$ such that the fault currents therethrough, are of a sufficient magnitude to cause a voltage drop thereacross of sufficient magnitude to cause the oscillator O to discontinue generating its output signal. Under such fault conditions the circuit interrupting means will return to its normally open position due to the failure of the oscillator O to continue to generate its signal output for energizing the coil 29.

In order to limit the current that can flow through the conductors 8 and 10 under certain conditions when the switch $S_1$ is closed a suitable electrical resistance $R_5$ is connected in series with the conductor 30 between the switch $S_1$ and the conductor 3. Without providing current limiting means a short circuit between the conductors 8 and 10 or anywhere in the machine wiring would cause immediate destruction of the switch $S_1$ upon its closure due to the heavy current flow therethrough. More important, depending on the nature of the fault, an incendiary arc could occur at the point of fault and ignite gas if the current were not limited to a comparatively safe value. Also, in the event an attempt is made to operate a machine on which a ground fault unknowingly exists the resistor $R_5$ limits the flow of current through the fault to keep the frame to earth potential to a safe value. Without the resistance $R_5$ full line potential could be impressed frame to earth creating a very hazardous condition.

As the frame 2 represents the frame of some suitable electrical apparatus the electrical load of the apparatus is shown connected to the terminals 4 and 6 in any suitable manner and may comprise any suitable electrically energized means which is desired to be controlled. In the illustrated example of a mine shuttle car the load may constitute one or more direct current motors secured to the frame 2 for causing movement of the shuttle car. Suitable controls K are also provided which are electrically connected between the terminals 4 and 6 and the load which normally disconnect the load from the conductors 8 and 10 during the period the circuit interrupter is in its normal open position. Such controls K are well known and accordingly their structure need not be more specifically described. By providing controls K for normally disconnecting the load from the terminals 4 and 6 the closing of the switch $S_1$ as heretofore described will cause only sufficient current for operation of the oscillator to flow through the conductors 30 and 8 and 32 and 10 due to the limiting action of $R_5$. Once, however, the circuit interrupting means has been closed the controls K are of a structure so as to electrically connect the load to the terminals 4 and 6 at will as is customary in the normal operation of the machine and in any manner as is well known in the art.

It is to be realized that various modifications from the structure as heretofore described may be desired for various purposes. Thus, for example, a normally closed electrical switch $S_2$, of well-known construction, may be connected in the conductor 58 which is movable to disconnect the resistance $R_1$ from the frame 2 in the event that a fault condition has occurred which has caused the oscillator output to cease. By opening the switch $S_2$ it will be obvious that the fault current will not flow through the resistance $R_1$ so that the oscillator O may again be energized by closing the switch $S_1$ to permit operation of the electrical apparatus. Although such operation of electrical apparatus involves a hazard, due to the existence of a fault current, it may be desirable that the apparatus be operable for limited period in order that the apparatus may be moved to permit repairs to be made thereto. In view of the electrical hazard of such operation the opening of switch $S_2$ should be controlled and for this purpose it may be desirable that the switch $S_2$ be sealed in its closed position in such a manner which necessitates the breaking of the seal to permit its operation. Also if desired a resistor $R_2$ may be connected in series with the conductor 58 between the resistor $R_1$ and the frame 2 in order to limit the magnitude of the fault current through the resistor $R_1$. As will become more apparent hereinafter the magnitude of current flow through the resistance $R_1$ is of great importance with relation to the operation of the oscillator O. Thus the resistance $R_2$ insures proper operation of the oscillator O under fault conditions and in addition limits the current so that it is of a magnitude to be acceptable by industrial safety standards.

Another modification may be made to my invention by connecting a blocking means $D_1$, such as a diode, a rectifier or other device having a high reverse impedance, as is well known in the art, to the conductor 58 in series with and between the resistor $R_2$ and the resistor $R_1$ so that fault current can only flow therethrough in one direction. The blocking means $D_1$ prevents any reverse current flow through the resistor $R_1$ in the event the line drop through conductors 8 and 10 is of sufficient magnitude to cause conductor 10 to be at a positive polarity with respect to the frame 2. Also, if desired, a resistance $R_3$ in series with an indicating device 65, such as a neon lamp having a low breakdown voltage, may be connected electrically between the conductors 56 and the frame 2 of the machine by means of a suitable electrical conductor 63. With such a circuit fault current will flow through the resistance $R_3$ and the indicating device 65 to indicate that an unsafe condition exists. Also a test circuit comprising a resistor $R_4$ and a normally open switch $S_3$ may be connected in series by means of a conductor 67 between the frame 2 and the conductor 34. Such a circuit will permit, upon closing of switch 53, a simulated fault current to flow through conductors 34 and 67 to the frame 2 and thereafter through the fault circuit as described, to test the operation of the complete protective system.

FIGURE 3 illustrates various components which have been heretofore shown and described with reference to FIGURE 1 and a feedback oscillator which is suited for use with my invention which comprises a pair of transistors $T_1$ and $T_2$ of well-known construction which are connected to produce an alternating current signal output in a manner as is well known in the art. As shown the transistor $T_1$ comprises a base $B_1$, a collector $CO_1$, and an emitter $E_1$ with the base $B_1$ being electrically connected in any suitable manner to the conductor 36. The emitter $E_1$ of transistor $T_1$ is electrically connected in any suitable manner to the conductor 34 and the collector $CO_1$ is electrically connected in any suitable manner to the conductor 60. In order to bias the collector $CO_1$ with respect to the base $B_1$ a biasing resistor $R_6$ is connected between the conductor 60 and 36 by means of a suitable electrical conductor 82. As also is well known in the art a coupling capacitor $C_2$ is electrically connected in the conductor 36 adjacent the conductor 82. In order to provide proper operating voltage for transistors $T_1$ and $T_2$ a limiting resistor $R_7$ may be electrically connected in series in the conductor 34 in which event a by-pass capacitor $C_3$ is electrically connected in parallel therewith by means of a suitable electrical conductor 84 in order to permit the alternating current signal output of the generator to appear across the conductors 34 and 36 as is well known in the art.

A parallel connected coil 70 and condenser 80 are electrically connected in the conductor 60 which are of a construction, as is well known in the art, to determine the output frequency of oscillator O. As conductor 56 is connected to the negative polarity conductor 10 through conductor 36 the polarity of conductor 56 at its juncture with resistance $R_1$ must necessarily be negative in respect to conductors 8, 34 and subsequently emitter $E_1$. As is well known a voltage gradient must exist between the emitter $E_1$ and collector $CO_1$ of the transistor $T_1$ in order for the transistor to produce an output signal. As the emitter $E_1$ is electrically connected to the conductor 34 which in turn is connected to the positive polarity terminal 4, the collector $CO_1$ is negative with respect to the emitter $E_1$. As the collector $CO_1$ is connected to conductor 60 the juncture of the conductors 60 and 58 must necessarily be negative with respect to the emitter $E_1$. At the same time in view of the resistance element $R_1$ the juncture of the connector 60 and 58 is positive with respect to the juncture of conductor 56 with the resistance $R_1$ in view of the voltage drop thereacross due to the current of the transistor $T_1$ flowing therethrough. In the event the juncture of conductors 60 and 58 becomes more positive with respect to the other end of the resistance $R_1$, it will be obvious that the collector $CO_1$ which is connected to the conductors 60 and 58 will become less negative with respect to the emitter $E_1$ until, depending upon the characteristics of the transistor $T_1$, the transistor $T_1$ no longer has an output current. It will be readily noted that as a fault current flows through resistance $R_1$ the juncture 66 and 58 will become more positive with respect to juncture 56 and 36 or alternatively stated less negative with respect to the emitter $E_1$. Accordingly, when the juncture of the conductors 60 and 58 reaches a certain polarity with respect to the emitter $E_1$ the transistor $T_1$ will no longer have a signal output.

As will become more apparent herein the output signal of the transistor $T_1$ is amplified by the transistor $T_2$ in order to obtain the desired power output of the oscillator O. With such a construction, cessation of the signal output of the transistor $T_1$ causes the entire signal output of the oscillator O to stop and, as heretofore described, deenergizes the conductors 8 and 10. In view of the characteristics of transistors the particular potential difference between the emitter $E_1$ and collector $CO_1$ which is required for operation of the transistor $T_1$ may be varied within certain limits. Thus as the voltage current required for operation of the transistor $T_1$ changes, the magnitude of fault current must also change before cutoff of the transistor $T_1$ output will occur. In actual practice the use components which permit a potential difference of 20 volts from the frames 2 to conductor 36 before cutoff occurs has been found desirable.

If desired, additional means may be provided in the oscillator O to prevent damage to the oscillator. Thus a blocking means $D_2$, such as a diode, rectifier or other device having a high reverse impedance, may be connected in the conductor 34 between the resistance $R_7$ and the emitter $E_1$ which will prevent a reverse current flow through the transistor $T_1$ in the event the fault current is of such a magnitude that the juncture of conductors 60 and 58 become exceedingly positive with respect to the emitter $E_1$. Also if desired a resistance element $R_9$ having a negative voltage characteristic may be connected across transistors $T_1$ and $T_2$ between conductors 34 and 36 to limit the voltage across the transistors. Such a resistance $R_9$ should have a characteristic such that the voltage thereacross will be substantially constant for relatively large changes of current such as the Thyrite resistor as is well known in the art.

The transistor $T_2$ is employed in the oscillator O to provide sufficient power output of the oscillator, accordingly in the event the power output of the transistor $T_1$ is sufficient for operation of the coil 29 as heretofore described, the transistor $T_2$ may be eliminated. The use of a plurality of amplifying transistors is desirable at the present time due to the characteristic of such transistor elements and the sensitivity of commercial detecting elements. Thus as shown the transistor $T_2$ is connected to the transistor $T_1$ in a manner as well known in the art with its base $B_2$ being connected to the collector $CO_1$ with a coupling condenser $C_5$ located between the base $B_2$ and the collector $CO_1$ of the transistor $T_1$. The collector $CO_2$ of the transistor $T_2$ is electrically connected to the conductor 36 by means of a conductor 94. The base $B_2$ is biased with respect to the collector $CO_2$ by means of a resistor $R_8$ electrically connected by means of suitable electrical conductor 96 extending between conductor 94 and the base $B_2$. The emitter $E_2$ of transistor $T_2$ is electrically connected by a suitable electrical conductor 74 to the conductor 34 between the blocking means $D_2$ and the resistance $R_7$.

FIGURE 2 illustrates a circuit diagram for an amplifier which is suitable for use in my invention in which certain components heretofore described in relation to FIGURE 1 have again been shown. The negative plurality conductor 54 is electrically connected to the conductor 44 as previously described so that the conductors 54—44 may be considered as a signal conductor. As shown the amplifier comprises two transistors $T_3$ and $T_4$ similar to the transistors previously described and which are connected to each other in a manner well known in the art to amplify a signal which is generated across the tuned detecting element comprising coil 40 and condenser 42. It will be obvious that more than the two stage amplification, as shown, may be provided. Further it is obvious that if the output of a single transistor is sufficient only one transistor need be employed rather than a pair of transistors.

A bypass conductor $C_{11}$ is electrically connected, as shown, between the conductors 54 and 52 which has a low impedance to the alternating current signal generated across the detector so that, with reference to such signal, conductors 54 and 52 are at the same potential. As shown the emitter $E_3$ of transistor $T_3$ is electrically connected to the conductor 52 and the base $B_3$ thereof is connected to the conductor 46 with a coupling capacitor $C_7$ being electrically connected between the base $B_3$ and the detector. A collector $CO_3$ is electrically connected to the conductor 54—44 by means of a suitable electrical conductor 112 having a resistance $R_{11}$ electrically connected therein. A biasing resistor $R_{10}$ is connected by means of a suitable electrical conductor 110 to the conductor 112 between the collector $CO_2$ and resistance $R_{11}$ and the conductor 46 between the capacitor $C_7$ and the base $B_3$. With such construction the resistance $R_{11}$ is a load resistance for the transistor $T_3$. When so connected the transistor $T_3$ operates as an amplifier such that the output across the resistance $R_{11}$ is of a greater magnitude than the signal input as is well known in the art.

The transistor $T_4$ has its emitter $E_4$ electrically connected to the conductor 52 between the connections of the emitter $E_3$ and the condenser $C_{11}$ thereto by means of a suitable electrical conductor 113. The base $B_4$ of the transistor $T_4$ is electrically connected to the collector $CO_3$ of transistor $T_3$ by means of the conductor 112 and a coupling capacitor $C_8$ is electrically connected therebetween. The collector $CO_4$ of transistor $T_4$ is electrically connected to the conductor 50. A parallel connected coil 114 and condenser 115, which are tuned to the frequency of the oscillator O output, are electrically connected by means of a suitable electrical conductor 120 to the conductor 52 between the emitters $E_3$ and $E_4$ and to the conductor 112 between the condenser $C_8$ and the base $B_4$. In order to sustain the current flow through the coil 29, a smoothing condenser $C_{10}$ is connected in parallel with the coil 29 by means of a suitable electrical conductor 116.

With such structure the transistor $T_4$ is operated as a switching transistor as the base 4 is connected to the emitter $E_4$ through the coil 114 which has a low resistance to keep the current flow through the transistor cutoff when no signal input exists. With the application of a signal between the base $B_4$ and the emitter $E_4$ the negative half cycles of the signal cause a current flow through the coil 29. The coil 114 and the condenser 115 make the switch more responsive to the oscillator frequency as is well known in the art.

It is also desirable that a limiting resistor $R_{13}$ be connected in series with conductor 52 ahead of the transistors $T_3$ and $T_4$ and a negative resistance characteristic resistance $R_{12}$ be connected by means of a suitable electrical conductor 107 across the conductors 52 and 54 ahead of the transistors $T_3$ and $T_4$. The resistor $R_{12}$ is similar to the resistor $R_9$ previously described and protects the transistors $T_3$ and $T_4$ from excessive voltage. In order to prevent inadvertent reversal of polarity from causing conduction of the transistor $T_4$ and energizing coil 29 without the presence of a signal, a shunt means 105 having a high reverse impedance such as a diode, or rectifier is electrically connected in parallel across the conductors 52 and 54, thus creating a short circuit across the transistor $T_4$ and the coil 29 under reverse polarity conditions and preventing energization of the coil 29.

From this description of my invention it will be noted that I have provided a device which prevents electrical energization of electrical apparatus under all fault conditions without having to provide a separate grounding conductor electrically connected to the electrical apparatus. Thus for example, if either conductor of the oscillator supply circuit beyond the terminal 12 and 14 is opened for any reason the output circuit of the oscillator is also opened and, consequently, the supply circuit to the electrical apparatus is also opened. Should an electrical fault exist or occur between the ungrounded conductor and the frame 2, the oscillator cannot be energized or will stop generating its output due to the fault current flow through the resistance $R_1$. Also as I have employed a simple linear resistance $R_1$ for obtaining such cutoff of the oscillator, which is directly connected to the oscillator output circuit, my device is economical and compact. A similar fault current will occur in the event of any serious failure of electrical insulation on the electrical apparatus or its supply cable. Also the entire device is inoperative due to any inadvertent reversing of the polarity of the supply conductors. It is obvious that my device may be designed to operation on any given polarity of the supply conductors, however, once constructed the device is only operative for a given polarity. Another feature of my invention is that the device is of the "fail safe" type, that is, upon breakage, decay, or failure of any component effecting the oscillator output the supply circuit to the electrical apparatus will be opened due to the cessation of the oscillator output.

Further, although I have described my invention with relation to a direct current source of power, it is to be realized that in many installations an alternating current source of power would be utilized in which event certain minor modifications may be necessary in the components of my invention in order that they may perform satisfactorily.

Although I have described various modifications of my invention which may be employed, it is to be realized that modifications thereof may be made, other than those specifically enumerated, without departing from the broad spirit and scope of my invention. Thus for example it is not essential that the operating coil per se, cause the rod 27 to move as any means for causing movement of the rod 27 in response to the output of the detecting element may be employed. Also with my device various output frequency of the oscillator may be employed as desired. Thus, the value of some of the components described is dependent upon the value of other components described which may be varied as desired with regard to a particular installation. Further, although I have shown and described the use of a resistor in the fault circuit it is particularly to be realized that other fault current responsive means, such as a similarly connected relay 200 (FIG. 4) having separable contacts 201 connected to cut off the oscillator, may be employed. Accordingly, it is desired that my invention be interpreted as broadly as possible and be limited only as required by the prior art.

What I claim is:

1. A circuit protecting device comprising, an oscillator which is electrically energized from and transmits an output signal over a pair of conductors, said oscillator having a pair of elements requiring a minimum voltage gradient therebetween when said oscillator produces said output signal, an electrical resistance element electrically connected across said elements, said resistance element having one end electrically connected to one of said conductors and the other end electrically connected to a device to be protected to vary said voltage gradient to a value below said minimum when an electrical fault current flows therethrough, a detector electrically connected to control means for controlling the electrical energization of said conductors, said detectors being responsive to said signal output to electrically energize said control means, and means for electrically energizing said oscillator through said conductors independently of said control means.

2. A circuit protecting device comprising a feedback oscillator which is electrically energized from a direct current source through a pair of electrical conductors and transmit an alternating current output signal over said conductors, said oscillator having a pair of elements requiring a minimum voltage gradient therebetween when said oscillator produces said output signal, an electrical resistance element electrically connected across said elements, said resistance element having one end electrically connected to one of said spaced conductors and the other end electrically connected to a device to be protected to vary said voltage gradient to a value below said minimum when an electrical fault current flows therethrough, an alternating current detector electrically connected to control means for controlling the direct current electrical energization of said conductors, said detector being responsive to said signal output to electrically energize said control means, and means for electrically energizing said oscillator from a direct current source through said conductors independently of said control means.

3. A protective device for controlling the electrical energization of an electrical circuit comprising, an electrical circuit, a circuit control means operable to electrically energize said electrical circuit when a portion of said circuit control means is electrically energized, means for selectively electrically energizing said electrical circuit independently of said circuit control means from the same source of electrical energy to which said circuit control means connects said electrical circuit, said electrical circuit having means connected thereto remote from said circuit control means for generating an electrical signal when said circuit is electrically energized which signal is transmitted through said electrical circuit, and said circuit control means including means for electrically energizing said portion only in response to said signal.

4. A protective device as defined in claim 3 in which said signal generating means comprises a feedback oscillator.

5. A protective device as defined in claim 3 in which said means connected to said electrical circuit includes electrical fault responsive means for causing cessation of said signal.

6. A protective device as defined in claim 5 in which said means connected to said electrical circuit includes means for visually indicating when a current flows through said fault responsive means.

7. A protective device as defined in claim 3 in which said means connected to said electrical circuit includes means for simulating an electrical fault to cause cessation of said signal.

8. A protective device for controlling the electrical energization of an electrical circuit comprising, an electrically energizable circuit control means which when electrically energized is operable to electrically energize an electrical circuit, means for selectively electrically energizing said electrical circuit independently of said circuit control means from the same source of electrical energy to which said circuit control means connects said electrical circuit, said electrical circuit having means for electrically energizing said circuit control means when said electrical circuit is electrically energized, said electrical circuit having electrical fault responsive means for electrically deenergizing said circuit control means, and said means for selectively energizing said electrical circuit including means for limiting the current in said electrical circuit when said electrical circuit is energized by said means for selectively energizing.

9. A protective device for controlling the electrical energization of an electrical circuit comprising, an electrical circuit, an electrically energizable circuit control means which when electrically energized is operable to electrically energize said electrical circuit, means for selectively electrically energizing said electrical circuit independently of said circuit control means from the same source of electrical energy to which said circuit control means connects said electrical circuit, said electrical circuit having means for electrically energizing said circuit control means when said electrical circuit is electrically energized, said electrical circuit having electrical fault responsive means for electrically deenergizing said circuit control means, and said electrical circuit having selectively operable means for simulating an electrical fault for independently electrically deenergizing said circuit control means.

10. A protective device for controlling the electrical energization of an electrical circuit comprising, an electrical circuit, an electrically energizable circuit control means which when electrically energized is operable to electrically energize said electrical circuit, means for selectively electrically energizing said electrical circuit independently of said circuit control means from the same source of electrical energy to which said circuit control means connects said electrical circuit, said electrical circuit having signal generating means for producing an electrical signal therein when said electrical circuit is electrically energized, said electrical circuit having means responsive to said signal therein for electrically energizing said circuit control means, said electrical circuit having electrical fault responsive means for causing the cessation of said signal, and said means for selectively energizing said electrical circuit including means for limiting the current in said electrical circuit when said electrical circuit is energized by operation of said selective means.

11. A protective device for controlling the electrical energization of an electrical circuit comprising, an electrical circuit, an electrically energizable circuit control means which when electrically energized is operable to electrically energize said electrical circuit, means for selectively electrically energizing said electrical circuit independently of said circuit control means from the same source of electrical energy to which said circuit control means connects said electrical circuit, said electrical circuit having signal generating means for producing an electrical signal therein when said electrical circuit is electrically energized, said electrical circuit having means responsive to said signal therein for electrically energizing said circuit control means, said electrical circuit having electrical fault responsive means for causing the cessation of said signal, and said electrical circuit having selectively operable means for simulating an electrical fault for independently electrically deenergizing said circuit control means.

12. A protective device for controlling the electrical energization of an electrical circuit comprising, an electrical circuit, a circuit control means which is operable to electrically energize said electrical circuit from a source of direct current when a portion of said circuit control means is electrically energized, means for selectively electrically energizing said electrical circuit independently of said circuit control means from the same source of electrical energy to which said circuit control means connects said electrical circuit, said electrical circuit having signal generating means remote from said circuit control means for producing an alternating current electrical signal therein when said electrical circuit is electrically energized, said circuit control means having means responsive to said alternating current signal therein for electrically energizing said portion of said circuit control means, and said electrical circuit having electrical fault responsive means for causing the cessation of said signal.

13. A device as defined in claim 12 in which said signal generator comprises an oscillator and said means responsive to said signal includes a tuned capacitor and inductance.

14. A protective device as specified in claim 12 in which said fault responsive means comprises a relay.

15. A circuit protecting device as defined in claim 13 in which said oscillator has a pair of elements requiring a minimum voltage gradient therebetween when said oscillator produces said signal, an electrical resistance element electrically connected across said elements, said resistance element having one end electrically connected to said electrical circuit and the other end being connected to a device to be protected to vary said voltage gradient to a value below said minimum when an electrical fault current flows therethrough.

16. A protective device for a machine comprising, a pair of electrical conductors connected to electrical means for electrically energizing a machine to be protected and to output terminals of a circuit control means, said circuit control means being operable to electrically energize said conductors through said output terminals when a portion of said circuit control means is electrically energized, means connected to said conductors for selectively electrically energizing said conductors independently of said circuit control means from the same source of electrical energy to which said circuit control means connects said conductors, signal generating means carried by said machine and connected to said conductors for producing an electrical signal in said conductors when said conductors are electrically energized, electrical means responsive to said signal in said conductors for electrically energizing said portion of said circuit control means, and electrical means connected to said machine and said signal generating means for causing the cessation of said signal when a current flows therethrough.

17. A protective device for a machine comprising, a trailing cable having a pair of electrical conductors connected to electrical means for electrically energizing means for moving a machine to be protected and to output terminals of a stationary circuit control means, said circuit control means being operable to electrically energize said conductors through said output terminals when a portion of said circuit control means is electrically energized, means connected to said conductors for selectively electrically energizing said conductors independently of said circuit control means from the same source of electrical energy to which said circuit control means connects said conductors, one of said conductors being electrically grounded when said conductors are electrically energized, signal generating means carried by said machine and connected to said conductors for producing an electrical signal in said conductors when said conductors are electrically energized, electrical means responsive to said signal in said conductors for electrically energizing said portion of said circuit control means, and electrical means connected to said machine and said signal generating means for causing the cessation of said signal when a current flows therethrough.

18. A protective device for a machine comprising, a pair of electrical conductors connected to electrical means for electrically energizing a machine to be protected and to output terminals of a circuit control means, said circuit control means being operable to electrically energize said conductors through said output terminals when a portion of said circuit control means is electrically energized, means connected to said conductors for selectively electrically energizing said conductors independently of said circuit control means from the same source of electrical energy to which said circuit control means connects said conductors, signal generating means carried by said machine and connected to said conductors for producing an electrical signal in said conductors when said conductors are electrically energized, and electrical means responsive to said signal in said conductors for electrically energizing said portion of said circuit control means.

References Cited in the file of this patent

UNITED STATES PATENTS

| | | |
|---|---|---|
| 1,798,690 | Ludwig | Mar. 31, 1931 |
| 1,817,526 | Rudenberg | Aug. 4, 1931 |
| 1,831,338 | Brown | Nov. 10, 1931 |
| 2,055,563 | Sorensen | Sept. 29, 1936 |
| 2,075,709 | Fallou | Mar. 30, 1937 |
| 2,089,997 | Farnham | Aug. 17, 1937 |
| 2,137,865 | Traver | Nov. 22, 1938 |
| 2,235,169 | Roberts | Mar. 18, 1941 |
| 2,307,771 | Denton | Jan. 12, 1943 |
| 2,480,385 | Sebring | Aug. 30, 1949 |
| 2,505,246 | Hudson | Apr. 25, 1950 |
| 2,637,843 | Kammerdiener | May 5, 1953 |
| 2,849,660 | Gygax | Aug. 26, 1958 |
| 2,874,337 | Sorensen | Feb. 17, 1959 |